(12) United States Patent
Wang (10) Patent No.: US 8,710,910 B2
(45) Date of Patent: Apr. 29, 2014

(54) VOLTAGE LEVEL SHIFT CIRCUITS AND METHODS

(71) Applicant: Diodes Incorporated, Plano, TX (US)

(72) Inventor: Jin Wang, Shanghai (CN)

(73) Assignee: Diodes Incorporated, Plano, TX (US)

( * ) Notice: Subject to any disclaimer, the term of this patent is extended or adjusted under 35 U.S.C. 154(b) by 0 days.

(21) Appl. No.: 13/684,138

(22) Filed: Nov. 21, 2012

(65) Prior Publication Data

US 2013/0076333 A1 Mar. 28, 2013

Related U.S. Application Data

(63) Continuation of application No. 12/979,180, filed on Dec. 27, 2010, now Pat. No. 8,339,186.

(51) Int. Cl.
G05F 1/10 (2006.01)
H02M 3/07 (2006.01)
(52) U.S. Cl.
CPC .................................. *H02M 3/073* (2013.01)
USPC ......................................................... 327/536

(58) Field of Classification Search
USPC ............ 327/530, 534–538, 540–543; 363/59, 363/60
See application file for complete search history.

(56) References Cited

U.S. PATENT DOCUMENTS

| | | | |
|---|---|---|---|
| 2006/0109205 A1* | 5/2006 | Deng | 345/46 |
| 2008/0084239 A1* | 4/2008 | Oswald et al. | 327/536 |
| 2010/0188065 A1* | 7/2010 | Shiwaya | 323/299 |

* cited by examiner

*Primary Examiner* — Lincoln Donovan
*Assistant Examiner* — Sibin Chen (57) ABSTRACT

In one embodiment, the present invention includes a charge pump circuit. The charge pump circuit comprises a plurality of terminals, a plurality of switches for selectively coupling the plurality of terminals, and a control circuit. A first input terminal receives a first reference voltage and a second input terminal receives a second reference voltage. First, second, third, and fourth flying capacitor terminals and the first and second input terminals are selectively coupled together in different configurations. The control circuit selects the switches to actuate according to a cycling of at least three phases of configuration. The cycling shifts the first and second reference voltages to provide dual power supply rails.

16 Claims, 7 Drawing Sheets

VOLTAGE LEVEL SHIFT CIRCUITS AND METHODS

CROSS REFERENCE TO RELATED APPLICATIONS

This application claims priority to provisional patent application No. 61/291,263 entitled "Single Supply Dual Output Charge Pump Driver" filed on Dec. 30, 2009, which is incorporated by reference in its entirety for all purposes.

BACKGROUND

Particular embodiments generally relate to voltage level shift circuits.

Figure 1:
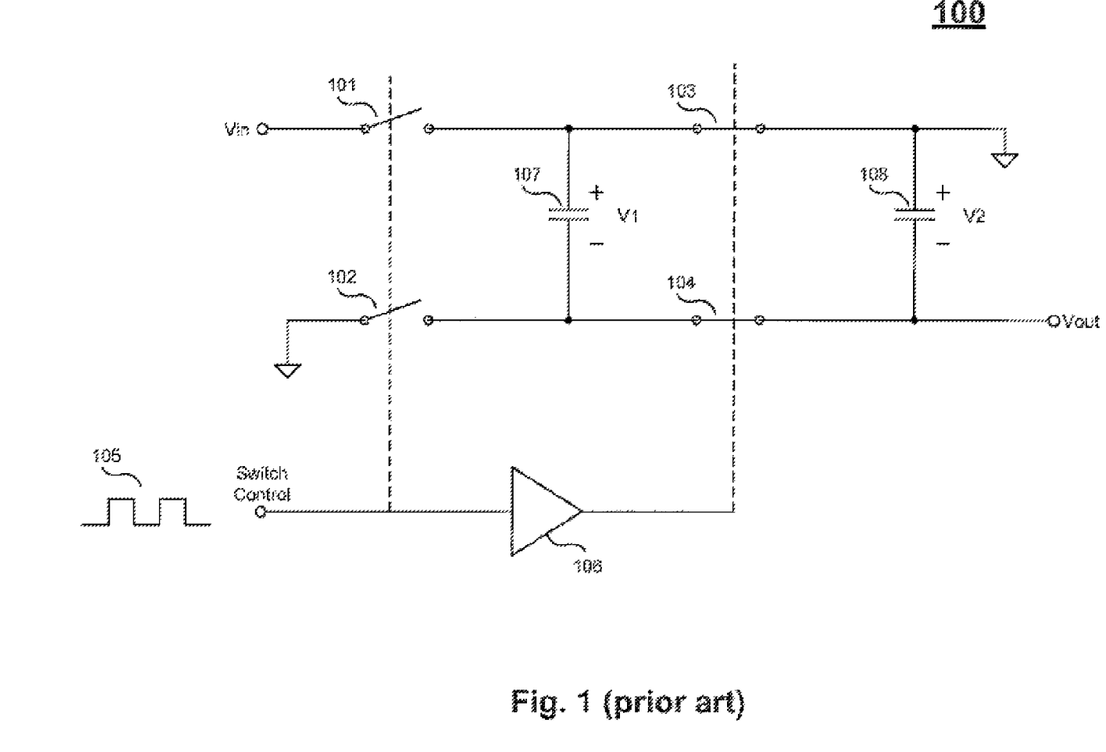
FIG. 1 illustrates a prior art charge pump circuit.

Charge pumps are widely used in integrated circuits (ICs). These circuits may convert one direct current (DC) voltage level to another DC voltage level using switching capacitor that transfer a stored charge. FIG. 1 illustrates a prior art charge pump circuit 100.

Charge pump 100 includes switches 101-104, an inverter 106, a flying capacitor 107, and a reservoir capacitor 108. Inverter 106 provides a complimentary signal to switches 101-104 such that either switches 101-102 or switches 103-104 are closed at any one time. In a state that is not shown in FIG. 1, signal 105 activates (closes) switches 101-102 and de-activates (opens) switches 103-104 such that inference voltage Vin charges flying capacitor 107. As shown, signal 105 changes state (e.g. from a high to low state) and de-activates (opens) switches 101-103 and activates (closes) switches 103-104. In this state, flying capacitor is coupled to and charges reservoir capacitor 108. The terminals across reservoir capacitor 108 establish that Vout=−Vin.

Charge pump 100 generates a negative power supply rail thus allowing a circuit to use both the positive power supply rail (Vin) and the negative power supply rail (Vout). Although charge pump 100 provides a dual power supply, the circuit has limitations. For example, charge pump 100 has doubled the range of the voltage rails to +/−Vin from a range of ground to Vin. This may be a waste of power for some low voltage/low power applications that do not require this range of voltage. Also, since charge pump 100 generates Vout and another circuit (not shown) provides Vin, the current capability of the dual power supply may be uneven. In this case, loading of the power supplies may result in a lopsided power delivery and affect the operation of a circuit requiring symmetric power supplies.

SUMMARY

In one embodiment the present invention include a charge pump circuit. The charge pump circuit comprises a plurality of terminals, a plurality of switches for selectively coupling the plurality of terminals, and a control circuit. A first input terminal receives a first reference voltage and a second input terminal receives a second reference voltage. First, second, third, and fourth flying capacitor terminals and the first and second input terminals are selectively coupled together in different configurations. The control circuit selects the switches to actuate according to a cycling of at least three phases of configuration. The cycling shifts the first and second reference voltages to provide dual power supply rails.

In one embodiment, the present invention includes a charge pump circuit comprising a first input terminal to receive a first reference voltage, a second input terminal to receive a second reference voltage, a first flying capacitor terminal, a second flying capacitor terminal, a third flying capacitor terminal, a fourth flying capacitor terminal, a first switch to selectively couple the first input terminal to the first flying capacitor terminal, a second switch to selectively couple the first flying capacitor terminal to the second input terminal, a third switch to selectively couple the second flying capacitor terminal to the second input terminal, a fourth switch to selectively couple the first flying capacitor terminal to the third flying capacitor terminal, a fifth switch to selectively couple the second flying capacitor terminal to the third flying capacitor terminal, a sixth switch to selectively couple the second flying capacitor terminal to the fourth flying capacitor terminal, and a control circuit to select the first, second, third, fourth, fifth, and sixth switches according to a cycling of at least three phases of configuration to generate a third voltage reference at the third flying capacitor terminal and a fourth voltage reference at the fourth flying capacitor terminal.

In one embodiment, the cycling deludes a first phase in which said control circuit selects the first and the fifth switch and deselects the second, the third, the fourth, and the sixth switch.

In one embodiment, the cycling includes a second phase in which said control circuit selects the third and the fourth switch and deselects the first, the second, the fifth, and the sixth switch.

In one embodiment, the cycling includes, a third phase in which said control circuit selects the second and the sixth switch and deselects the first, the second, the fourth, and the fifth switch.

In one embodiment, the charge pump further comprises a first flying capacitor coupled between the first and second flying capacitor terminals, a second flying capacitor coupled between the third and fourth flying capacitor terminals, and a reservoir capacitor coupled between the third flying capacitor terminal and the second input terminal, wherein, during the third phase, charge transfers between the first flying capacitor and the second flying capacitor.

In one embodiment, the second phase is timed such that the reservoir capacitor and the first flying capacitor share charge.

In another embodiment, the present invention includes an integrated circuit comprising a drive circuit and a charge pump circuit coupled to provide power to said circuit. The charge pump circuit includes a first input terminal to receive a first supply voltage, a second input terminal to receive a second supply voltage, a first flying capacitor terminal, a second flying capacitor terminal, a third flying capacitor terminal, a fourth flying capacitor terminal, a first switch to selectively couple the input terminal to the first flying capacitor terminal, a second switch to selectively couple the first flying capacitor terminal to the second input terminal, a third switch to selectively couple the second flying capacitor terminal to the second input terminal, a fourth switch to selectively couple the first flying capacitor terminal to the third flying capacitor terminal, a fifth switch to selectively couple the second flying capacitor terminal to the third flying capacitor terminal, a sixth switch, to selectively couple the second flying capacitor terminal to the fourth flying capacitor terminal, and a control circuit to select the first, second, third, fourth, fifth, and sixth switches according to a cycling of at least three phases of configuration, wherein the charge pump converts the first and the second supply voltages to a third supply voltage and a fourth supply voltage in order to provide said power to said circuit, wherein a first difference between the first and second supply voltages is approximately equal to a second difference between the third and fourth supply voltages, and wherein the third supply voltage is greater than the second supply voltage by half the first difference and the fourth supply voltage is less than the second supply voltage by half the first difference.

In one embodiment, the third flying capacitor terminal is coupled to the circuit to provide the third supply voltage, and wherein the fourth flying capacitor terminal is coupled to the circuit to provide the fourth supply voltage.

In one embodiment, the third and fourth supply voltages provide symmetrical supply rails to said circuit, and in accordance therewith, provide a larger dynamic range for said circuit to process alternating current signals.

In one embodiment, the drive circuit includes an audio amplifier.

In one embodiment, the drive circuit includes an earphone driver.

In one embodiment, the present invention includes a method comprising selectively coupling a first input terminal to a first flying capacitor terminal, selectively coupling the first flying capacitor terminal to a second input terminal, selectively coupling a second flying capacitor terminal to the second input terminal, selectively coupling the first flying capacitor terminal to a third flying capacitor terminal, selectively coupling the second flying capacitor terminal to the third flying capacitor terminal, selectively coupling the second flying capacitor terminal to a fourth flying capacitor terminal and cycling of at least three phases of configuration, and controlling a selection of the coupling according to the cycling.

In one embodiment, the cycling includes a first phase in which the selection of the coupling includes coupling the first input terminal to the first flying capacitor terminal and coupling the second flying capacitor terminal to the third flying capacitor terminal, wherein the first flying capacitor terminal is decoupled from the second input terminal, the second flying capacitor terminal is decoupled from the second input terminal, the first flying capacitor terminal is decoupled from the third flying capacitor terminal, and the second flying capacitor terminal is decoupled from the fourth flying capacitor terminal.

In one embodiment, the cycling includes a second phase in which the selection of the coupling includes coupling the second flying capacitor terminal to the second input terminal and coupling the first flying capacitor terminal to the third flying capacitor terminal, wherein the first input terminal is decoupled from the first flying capacitor terminal, the first flying capacitor terminal is decoupled from the second input terminal, the second flying capacitor terminal is decoupled from the first flying capacitor terminal, and the second flying capacitor terminal is decoupled from the fourth flying capacitor terminal.

In one embodiment, the cycling includes a third phase in which the selection of the coupling includes coupling the first flying capacitor terminal to the second input terminal and coupling the second flying capacitor terminal to the fourth flying capacitor terminal, wherein the first input terminal is decoupled from the first flying capacitor terminal, the second flying capacitor terminal is decoupled from second input terminal, the first flying capacitor terminal is decoupled from the third flying capacitor terminal, and the second flying capacitor terminal is decoupled from the third flying capacitor terminal.

In one embodiment, the method further comprises timing the second phase such that a reservoir capacitor coupled between the third flying capacitor terminal and the second reference voltage shares charge with a first flying capacitor coupled between the first and second flying capacitor terminals.

In one embodiment, the method further comprises a second flying capacitor coupling charge between the third and fourth flying capacitor terminals during the third phase.

The following detailed description and accompanying drawings provide a better understanding of the nature and advantages of the present invention.

DETAILED DESCRIPTION

Described herein are techniques for voltage level shift circuits and methods. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 2:
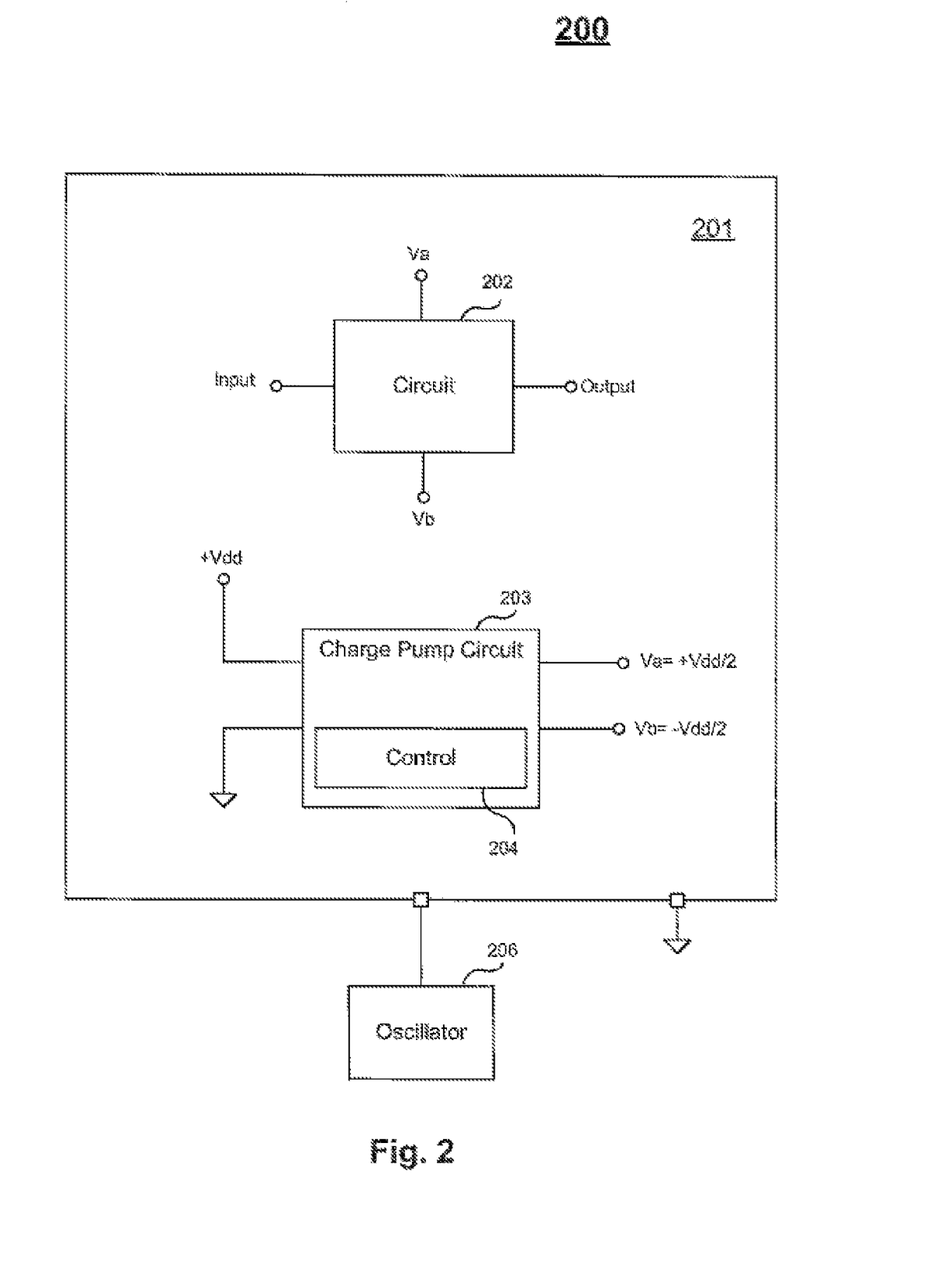
FIG. 2 illustrates a block diagram according to one embodiment of the present invention.

FIG. 2 illustrates a system 200 according to one embodiment of the present invention. System 200 includes art integrated circuit 201 and an oscillator 206. Integrated circuit 201 receives an oscillating signal from oscillator 206. Integrated circuit 201 may generate a derivative of the oscillator signal to perform tasks within the integrated circuit 201, such as power management and/or signal processing. Integrated circuit 201 includes a circuit 202 requiring dual power supply rails and a charge pump circuit 203 that provides the dual power supply rails from a single ended power supply (+Vdd). A voltage difference (Vdd−−gnd=Vdd−0V=Vdd) at the input of circuit 202 has been shifted down to maintain the voltage difference between the dual voltage outputs (Va and Vb) at the voltage difference of the input For example, the voltage difference between the dual voltage outputs is Va−Vb=Vdd.

Charge pump circuit 203 provides a voltage shift of the input voltage range such that the single ended supply is converted to a dual voltage supply centered around ground. Charge pump circuit 203 receives the supply voltage Vdd and the ground supply voltage (e.g., 0V) and converts these voltages to supply voltage Va and supply voltage Vb to provide power to circuit 202. The difference between the Vdd and ground voltages may be approximately equal to the difference between the dual output supply voltages Va and Vb as illustrated by the following equations:

$$\Delta Vin = \Delta Vout$$

$$Vdd - 0V = Va - Vb.$$

Supply voltage Va may be greater than ground by half ΔVin and supply voltage Vb may be less than ground by half ΔVin as illustrated by the following equations:

$$Va = 0V + (\tfrac{1}{2})Vdd = Vdd/2$$

$$Vb = 0V - (\tfrac{1}{2})Vdd = -Vdd/2.$$

This shifts the input voltage to a dual voltage supply centered around ground. As will be described below in more detail, a current balance of charge pump circuit 203 may cause the center voltage between Va and Vb to be slightly vary from ground. Particular embodiments are used to rectify the problem and cause the center voltage of the dual power supply to be at ground.

Charge pump circuit 203 includes a control circuit 204. The control circuit 204 may use a signal from the oscillator 206 to generate control signals that switch internal switches to generate voltage supplies Va and Vb.

Circuit 202 may provide signal processing such as amplification of alternating current (AC) signals centered about a ground reference voltage (e.g., 0V). Ground referenced signals require dual voltage supplies so that negative excursions of the signal are propagated as well as positive excursions above the ground reference voltage. Audio signals and radio frequency (RF) signals are two examples of signals that are customarily processed that have a ground reference.

In one embodiment, circuit 202 amplifies audio signals. Circuit 202 receives a low level audio input signal at the input terminal and supplies an amplified output signal at the output terminal. The output signal is referenced to ground, and supply voltages Va and Vb may be symmetrical about ground. The difference between the dual supplies (Va−Vb=Vdd) may maintain the dynamic range for circuit 202 to process alternating current (AC) signals that are referenced to ground.

Supply voltage Vdd and the input signal to circuit 202 may be internally generated or derived reference voltages within integrated circuit 201. In another embodiment, reference voltage Vdd is a supply voltage provided externally and the input signal to circuit 202 are provided externally from the integrated circuit 201.

Particular embodiments use a series of phases to improve the operation of charge pump 203. The phases actuate switches to balance the Q between two capacitors of charge pump 203. This causes the center voltage of the dual power supply to be at ground. In one example, three phases are used to open and close six switches in charge pump 203. Although three phases and six switches are described, three capacitors are switched in concert to keep the positive and negative supply rails of the charge pump approximately symmetrical about a ground reference voltage. A flying capacitor and a reservoir capacitor are switched in one phase to equable their voltages, and then a second flying capacitor is used in another phase to proportionally discharge the first flying capacitor sad reservoir capacitor and thereby keep the symmetry of the positive and negative supplies substantially symmetrical about the ground reference voltage.

Figure 3A:
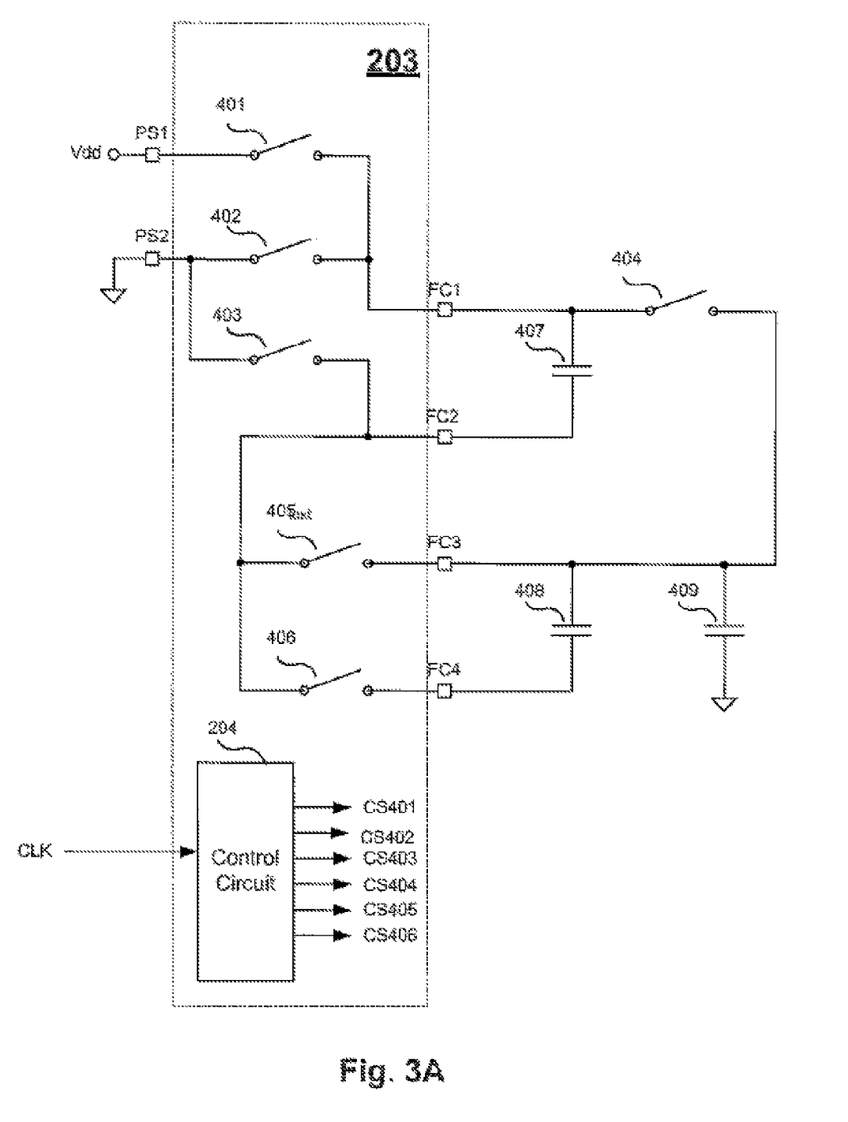
FIG. 3A-3D illustrate a charge pump circuit in various configurations according to one embodiment of the present invention.

FIG. 3A-3D illustrate a charge pump circuit 203 in various configurations according to one embodiment. FIG. 3A illustrates charge pump circuit 203 in a power up configuration having all switches is an open state. This may be considered an initial stage before the three phases occur. Charge pump circuit 203 includes power supply input terminals PS1-PS2, flying capacitor terminals FC1-FC4, switches 401-406, and control circuit 204. Capacitors 407-409 may also be located off chip. Reference voltage Vdd is converted to a symmetrical dual voltage through a cycling of at least three phases of configuration of circuit 203 to generate a voltage reference (+Vdd/2) at flying capacitor terminal FC3 and a voltage reference (−Vdd/2) at flying capacitor terminal FC4.

Input terminal PS1 receives reference voltage Vdd and input terminal PS2 receives a ground reference voltage. Switch 401 selectively couples input terminal PS1 to flying capacitor terminal FC1 and switch 402 selectively couples flying capacitor terminal FC1 to input terminal PS2. Switch 403 selectively couples flying capacitor terminal FC2 to input terminal PS2 and switch 404 selectively couples flying capacitor terminal FC1 to flying capacitor terminal FC3. Switch 405 selectively couples flying capacitor terminal FC2 to flying capacitor terminal FC3, and a switch 406 selectively couples flying capacitor terminal FC2 to flying capacitor terminal FC4.

Charge pump circuit 203 also includes flying capacitor 407-408 and reservoir capacitor 409. A flying capacitor may be defined as a capacitor in which neither of its terminals directly connects to a fixed reference voltage. Flying capacitor 407 is coupled between flying capacitor terminals FC1 and FC2. Flying capacitor 408 is coupled between flying capacitor terminals FC3 and FC4. Reservoir capacitor 409 is coupled between flying capacitor terminal FC3 and input terminal PS2.

Charge pump circuit 203 also includes control circuit 204. Control circuit 204 receives a clock signal CLK and provides control signals CS401-CS406 to actuate switches 401-406 respectively. Control circuit 204 may be programmed to cycle through at least three phases in which the configuration of switches 401-406 are selectively actuated.

Figure 3B:
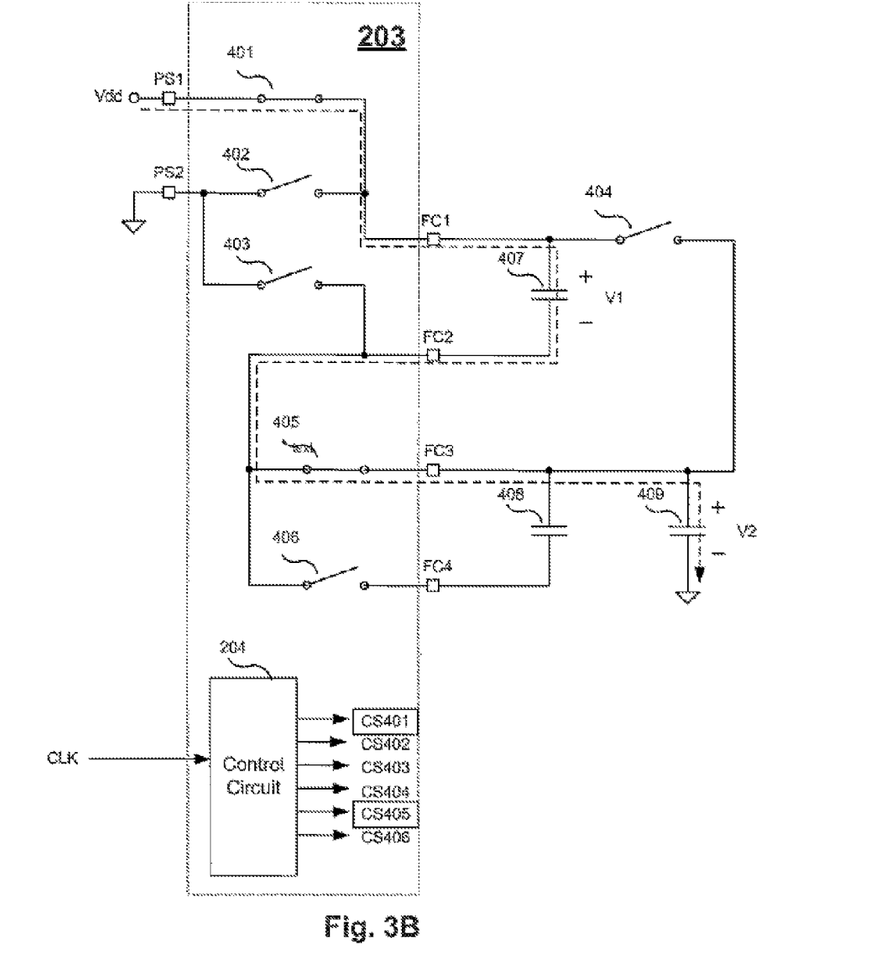

The three phases will now be described. FIG. 3B illustrates a configuration that may be used during one phase of operation of charge pump 400. This phase may be a positive charging phase that charges capacitors 407 and 409.

During this phase, control circuit 204 may select switches 401 and 405 by actuating the switches with signals CS401 and CS405. Control circuit 204 may deselect switches 402, 403, 404, and 406 by providing corresponding signals CS402, CS403, CS404, and CS406 that de-actuate the switches, respectively.

The actuating of switch 401 couples input terminal PS1 to flying capacitor terminal FC1 and the actuating of switch 405 couples flying capacitor terminal FC2 to flying capacitor terminal FC3. In this phase, flying capacitor terminal FC1 is decoupled from input terminal PS2 through switch 402, flying capacitor terminal FC2 is decoupled from input terminal PS2 through switch 403, flying capacitor terminal FC1 is decoupled from flying capacitor terminal FC3 through switch 404, and flying capacitor terminal FC2 is decoupled from flying capacitor terminal FC4 through switch 406.

The dashed line shows the path of current through circuit 203. Both flying capacitor 407 and reservoir capacitor 409 are charged by reference voltage Vdd. Capacitor 408 is floating due to switch 406 being open and is not charged. If the capacitance of both capacitors is comparable, a voltage V1 across capacitor 407 may be approximately equal to a voltage V2 across capacitor 409.

The timing of this phase may allow this path (indicated by the dashed line) to persist for a time period that allows capacitors 407 and 408 to folly charge. Also, this phase may begin with a de-actuation of switches 402-404, and 406 prior to actuation of switches 401 and 405. In an alternate embodiment, all the switches are de-actuated or otherwise put into an open state prior to the beginning of each phase and prior to the selecting of the switches to actuate or otherwise put into a closed state.

Figure 3C:
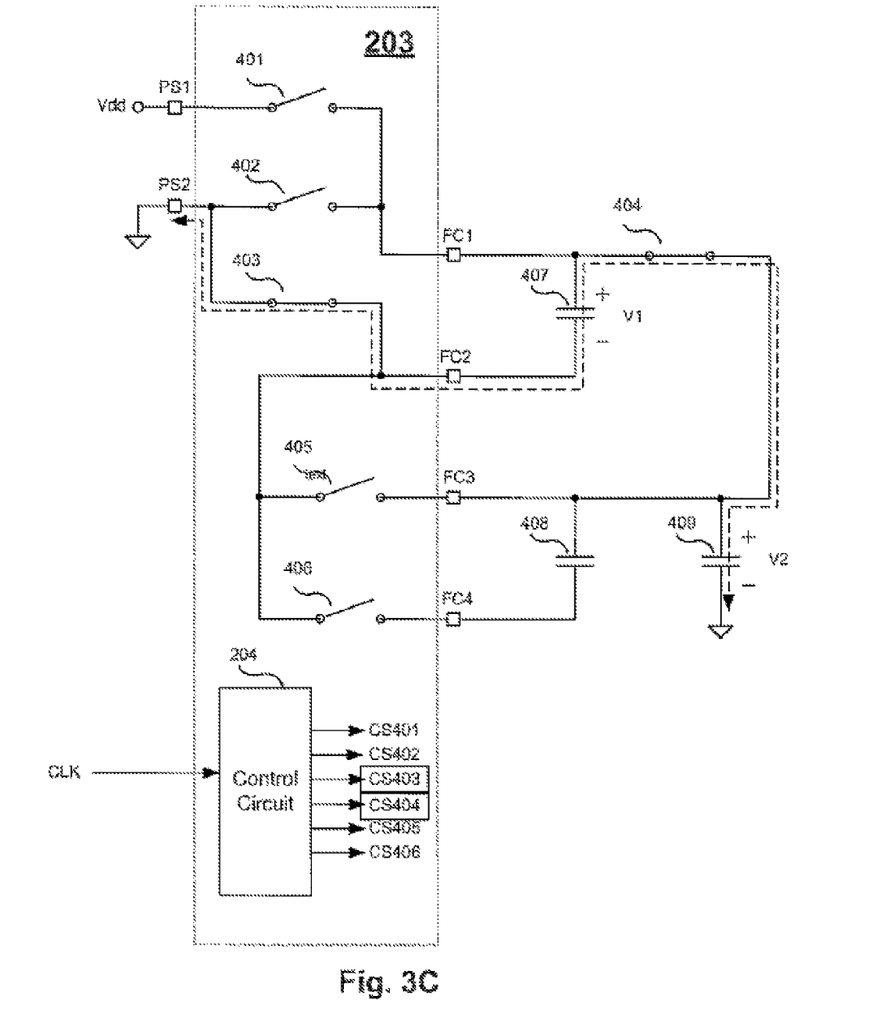

FIG. 3C illustrates a configuration which may be used during another phase of operation of charge pump circuit 203 according to one embodiment. This phase may be the second phase after the first phase. The second phase is a sharing phase to equalise the voltages V1 and V2 across capacitors 407 and 409.

During this phase, control circuit 204 may select switches 403 and 404 by actuating the switches with signals CS403 and CS404. Control circuit 204 may deselect switches 401, 402, 405, and 406 by providing corresponding signals CS401, CS402, CS405, and CS406 that de-actuate the switches, respectively.

The actuation of switch 403 couples flying capacitor terminal FC2 to input terminal PS2, and the actuation of switch 404 couples frying capacitor terminal FC1 to flying capacitor terminal FC3. In this phase, input terminal PS1 is decoupled from flying capacitor terminal FC1 through switch 401, flying capacitor terminal FC1 is decoupled from input terminal PS2 through switch 402, flying capacitor terminal FC2 is decoupled from flying capacitor terminal FC3 through switch 405, and flying capacitor terminal FC2 is decoupled from flying capacitor terminal FC4 through switch 406.

The dashed line shows the path of current through circuit 203. In this case, depending on the matching of the voltages V1 and V2, the current may be flowing in either direction, thereby sharing charge to equalize the voltage level between capacitors 407 and 409. For example, after a previous phase (e.g. a phase using the configuration, of FIG. 3B) a voltage V1 may not match voltage V2 to a certain degree due to slightly differing capacitance values between the capacitors. In this case, the configuration of FIG. 3C couples the capacitors in parallel to equalize the voltages V1 and V2 to be at least approximately equal. Voltage V2 provides the positive supply rail and voltage V1 is used to provide the negative supply rail (to be described in regard to FIG. 3D) and the more these two voltages have matching voltage values, the more symmetrical the rails are about ground. The levels at which the voltages match depend on the timing of this phase.

The timing of this phase may allow this path (indicated by the dashed line) to persist for a time period that allows capacitors 407 and 408 to reach a steady state in which less than 1 ua of current may flow between the capacitors. During this, time period, reservoir capacitor 409 shares an amount of charge with flying capacitor 407 that allows the voltages V1 and V2 to substantially match each other.

Figure 3D:
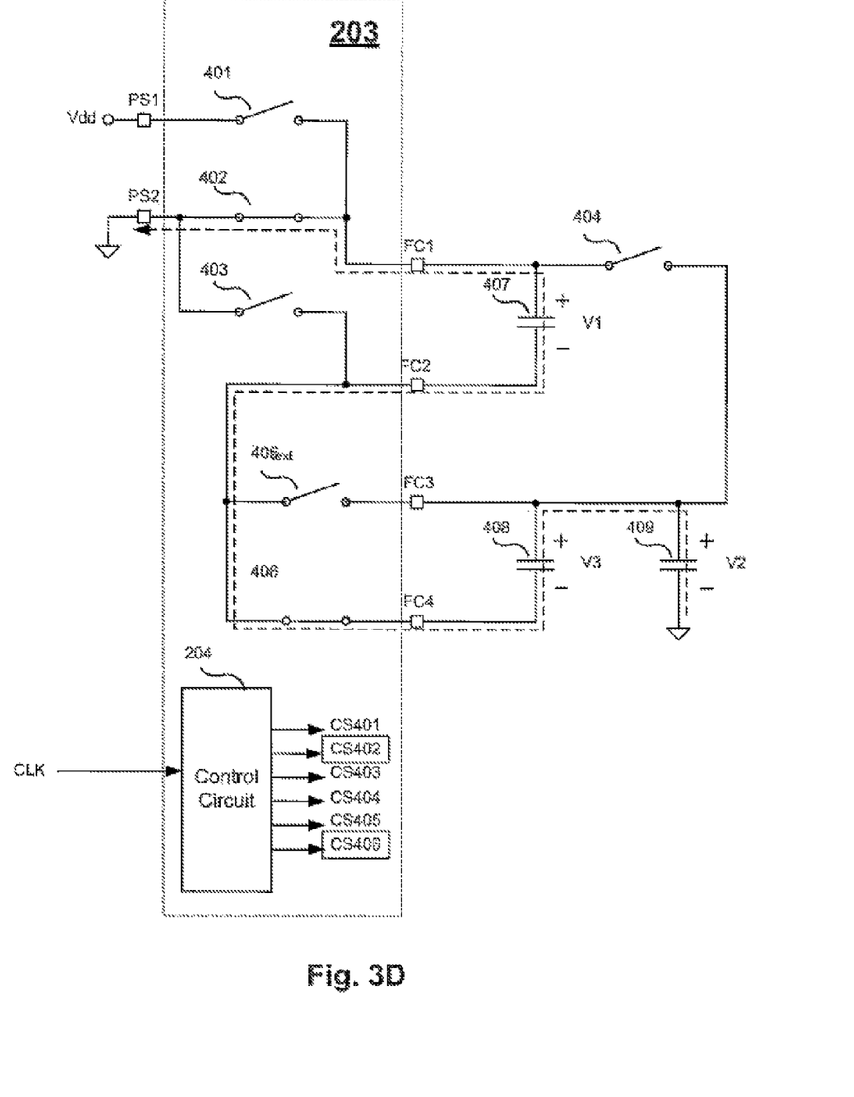

FIG. 3D illustrates a configuration which may be used during another phase of operation of charge pump 400. This third phase may be performed after the second phase. The third phase is a negative sharing phase.

During this phase, control circuit 204 may select switches 402 and 406 by actuating the switches with signals CS402 and CS406. Control circuit 204 may deselect switches 401, 403, 404, and 405 by providing corresponding signals CS401, CS403, CS404, and CS405 that de-actuate the switches, respectively The actuation of switch 402 couples flying capacitor terminal FC1 to input terminal PS2 and the actuation of switch 406 couples flying capacitor terminal FC2 to flying capacitor terminal FC4. In this phase, input terminal PS1 is decoupled from flying capacitor terminal FC1 through switch 401, flying capacitor terminal FC2 is decoupled from input terminal PS2 through switch 403, flying capacitor terminal FC1 is decoupled from flying capacitor terminal FC3 through switch 404, and flying capacitor terminal FC2 is decoupled from flying capacitor terminal FC3 through switch 405.

The dashed line shows the path of current through circuit 203. Flying capacitor 407, and reservoir capacitor 409 discharge proportionately into flying capacitor 408, thereby keeping the voltage V2 and −V1 approximately symmetrical about the ground reference voltage. The configuration of switches of FIG. 3D inverts the polarity of flying capacitor 407 with respect to reservoir capacitor 409 to provide the negative supply rail at flying capacitor terminal FC4. For example, flying capacitor terminal FC3 may have a voltage value V2=2V and flying capacitor terminal FC4 may have a voltage value −V1=2V. The charge from both flying capacitor 407 and reservoir capacitor 409 pass charge to flying capacitor 408. After a number of cycles, flying capacitor 408 may be charged to voltage V3 having a value twice the value of voltage, and in accordance therewith, providing the negative supply rail at flying capacitor terminal FC4. If Vin=4V and V2=V1=2V, then $$V3 = V2 = (-V1) = 2 - (-2) = 4V$$

The symmetry of the positive and negative supply rails around a ground reference depends on V1 and V2 matching in voltage and the capacitors 407 and 409 discharging proportionately into capacitor 408. The timing of the phase of configuration explained in regard to FIG. 3C may improve this matching and therefore improve the symmetry of the two supply rails centered on ground.

Control circuit 204 may be specially configured to cycle through at least three phases. Below is a sequence of events that may be included in an algorithm according to one embodiment of the invention.

Sequence of Events

Phase 1:
1) Open all switches
2) Wait for a setting time (e.g. 1 ms)
3) Close switches 401 and 405
4) Wait for a time period commensurate with the values of capacitors 407 and 408 such that both capacitors are substantially charged (e.g., 99% fully charged)
5) Open switches 401 and 405
Phase 2:
6) Open all switches
7) Wait for a settling time (e.g. 10 ns)
8) Close switches 403 and 404
9) Wait for a time period commensurate with the values of capacitors 407 and 408 such that both capacitors are substantially at steady state such that less than 1 ua of current is flowing between the capacitors
10) Open switches 403 and 404
Phase 3:
11) Open all switches
12) Wait for a settling time (e.g. 1 ms)
13) Close switches 402 and 406
14) Wait for a time period such that voltage V3 has reached at least 90% of its steady state value.
15) Repeat events 1-14 above (i.e. phases 1-3).

In another embodiment the timing for events 4, 9, and 14 above have the same period and that period corresponds to the clock period. In another embodiment, event 2, 3, 6, 7, 8 and 11, 12, 13 occur on the rising edge of the clock signal, and events 1, 5, 10 occur on the falling edge of the clock signal.

In one embodiment, switches 401-406 may be analog switches having a control input coupled to control circuit 204. This may be a means in which terminals are selectively coupled together. In some implementations, level shift circuits may be generate control signals at the control inputs, for example. Control circuit 204 may be a state machine that implements the above algorithm. In one embodiment, the state machine may be implemented on a gate array or similar structure using Verilog or VHDL synthesis. In one embodiment, the cycling through the phases may be accomplished by clocking through the events as documented above.

Figure 4:
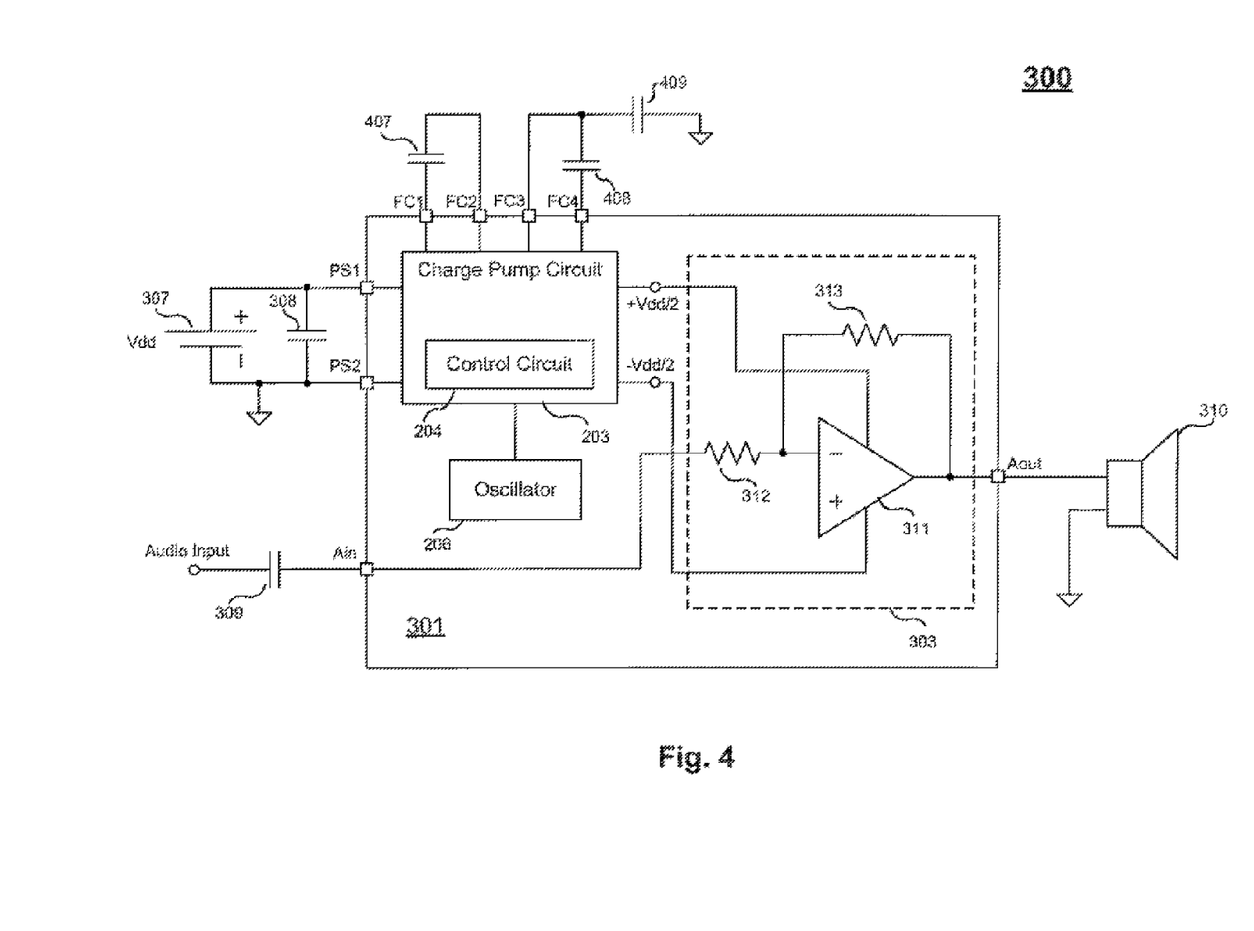
FIG. 4 illustrates an earphone driver circuit according to another embodiment of the present invention.

Particular embodiments may be implemented in different ways, such as in earphone driver circuits. FIG. 4 illustrates an earphone driver circuit 300 according to another embodiment of the present invention. Earphone driver circuit 300 may use charge pump circuit 204 and control circuit 203. As shown, capacitors 407, 408, and 409 are off chip. Although not shown, switches 401-406 are on chip.

An integrated circuit 301 receives an analog signal (e.g., input audio signal) through a capacitor 309 and receiving power from a battery 307. A capacitor 308 may be used to bypass battery 307 and provide a reservoir of charge for temporary current increases by integrated circuit 301. Integrated circuit 301 amplifies a ground referenced version of the input audio signal through an amplifier 311 and provides an amplified version of the audio signal that is sufficient to a drive speaker 310. The voltage supply levels for amplifier 311 are shifted down to provide the ground centered dual supplies (+Vdd/2, −Vdd/2) that have a difference similar to the single ended supply input Vdd.

Integrated circuit 301 includes charge pump circuit 203 that provides dual supplies to drive circuit 303. Charge pump circuit 203 receives a first reference voltage at power supply input terminal PS1 and a second reference voltage at power supply input terminal PS2. Charge pump circuit 203 is coupled to flying capacitor terminals FC1-FC4 to use flying capacitors 407-408. Charge pump circuit 203 may also have reservoir capacitor 409 coupled to flying capacitor terminal FC3.

As described above, charge pump circuit 203 may switch a plurality of switches 401-406 to couple and decouple the input terminals PS1-PS2 and the flying capacitor terminals FC1-FC4 to convert single ended voltage Vdd to voltage +Vdd/2 and voltage −Vdd/2. Charge pump circuit 203 receives an oscillator signal from internal oscillate 206, and control circuit 204 may use the oscillator signal to step through phases of switch configurations as described above. Control circuit 204 may be a state machine that steps through a number of states and provides control signals to the internal switches of charge pump circuit 203. Charge pump circuit 203 provides voltage reference Vdd/2 and −Vdd/2 to drive circuit 303.

Drive circuit 303 amplifies a ground based version of the audio input signal circuit 303 includes amplifier 311 coupled to drive speaker 310. Amplifier 311 has resistors 312-313 coupled to an inverting gain configuration. The inverting terminal of amplifier 311 is coupled to the audio input terminal through resistor 312 and coupled to the output terminal of amplifier 311 through resistor 313. The non-inverting terminal of amplifier 311 receives the ground reference voltage. The upper supply rail of amplifier 311 receives reference voltage +Vdd/2 and the lower supply rail of amplifier 311 receives reference voltage −Vdd/2. The output swing driven by amplifier 311 will be within the reference voltage levels +Vdd/2 and −Vdd/2.

In another embodiment, integrated circuit 301 may have a pair of stereo inputs that are amplified to drive a left and right earphone. In this embodiment there may be a duplicate audio input terminal coupled to an input capacitor (not shown) to receive the left channel signal while the channel shown receives the right channel signal. The left signal may also be amplified by as amplifier and a set of resistors (not shown) coupled in an inverting gain configuration similar to circuit 303 such that the left signal is amplified with reference to ground. This left channel may drive a corresponding speaker (not shown) similar to speaker 310.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

I claim:

1. An electrical circuit, comprising
a first terminal for engaging a first reference voltage;
a second terminal for engaging a second reference voltage, which is different from the first reference voltage;
a first capacitor and a second capacitor;
a plurality of switches operable to selectably connecting the first reference voltage and the second reference voltage to the first capacitor and the second capacitor; and
a third capacitor having two terminals operable to be connected by the plurality of switches to the first capacitor and the second capacitor to generate at one of the two terminals a voltage outside the voltage range between the first reference voltage and the second reference voltage and at the other one of the two terminals a voltage inside the voltage range between and not including the first reference voltage and the second reference voltage.

2. The electrical circuit of claim 1, in which the switches are integrated in one integrated circuit chip.

3. The electrical circuit of claim 2, in which the first capacitor and the second capacitor and the third capacitor are electrically externally connected to the integrated circuit chip.

4. The integrated circuit chip of claim 2, further comprising a control circuit for selectably activating and deactivating the plurality of switches.

5. The control circuit of claim 4, further comprising a terminal for engaging a clock signal.

6. The electrical circuit of claim 5, further comprising an oscillator for supplying the clock signal engaging the control circuit.

7. The electrical circuit of claim 1, in which the first capacitor and the second capacitor are of same capacitance.

8. The integrated circuit of claim 1, in which the plurality of switches are operable in one configuration connecting the first capacitor and the second capacitor in series and in a second and different configuration connecting the first capacitor and the second capacitor in parallel.

9. The integrated circuit of claim 1, in which the plurality of switches are further operable to connect the third capacitor between the first capacitor and the second capacitor in a configuration where a positively charged end of the first capacitor is electrically shorted to a negatively charged end of the second capacitor.

10. A integrated circuit chip, comprising:
a plurality of switches selectably operable to urge on a first capacitor and a second capacitor a first reference voltage and a second reference voltage, which is at a different voltage from the first reference voltage, such that a fraction of the voltage difference is maintained across the first capacitor and across the second capacitor; and
the plurality of switches selectably operable to connect a third capacitor having two terminals to the first capacitor and the second capacitor to yield a voltage at one of the two terminals outside the voltage range between the first reference voltage and the second reference voltage, and a voltage at the other terminal of the two terminals inside the voltage range between but not including the first reference voltage and the second reference voltage.

11. The integrated circuit chip of claim 10, further comprising a control circuit for selectably activating and deactivating the plurality of switches.

12. The control circuit of claim 11, further comprising a terminal for engaging a clock signal.

13. The integrated circuit chip of claim 10, in which the plurality of switches are operable in one configuration connecting the first capacitor and the second capacitor in series and in a second and different configuration connecting the first capacitor and the second capacitor in parallel.

14. The integrated circuit chip of claim 13, in which the plurality of switches are further operable to connect the third capacitor between the first capacitor and the second capacitor in a configuration where a positively charged end of the first capacitor is electrically shorted to a negatively charged end of the second capacitor.

15. The integrated circuit chip of claim 14, in which the voltage range is between a positive voltage and a ground potential.

16. The integrated circuit chip of claim 15, in which one end of the third capacitor is at a voltage of half the voltage difference above the ground potential and another end of the third capacitor is at a voltage of half the voltage difference below the ground potential.

\* \* \* \* \*